United States Patent [19]
Hashizume et al.

[11] Patent Number: 5,381,893
[45] Date of Patent: Jan. 17, 1995

[54] HOUSING CASE FOR TAPE CASSETTE WITH INDEX CARD

[75] Inventors: Kenji Hashizume; Masatoshi Okamura, both of Tokyo, Japan

[73] Assignee: TDK Corporation, Tokyo, Japan

[21] Appl. No.: 189,368

[22] Filed: Jan. 31, 1994

[30] Foreign Application Priority Data

Feb. 5, 1993 [JP] Japan ................ 5-008087[U]

[51] Int. Cl.6 ........................................... B65D 85/672
[52] U.S. Cl. ................................. 206/232; 206/387.1
[58] Field of Search ................. 206/232, 387, 459.5

[56] References Cited

U.S. PATENT DOCUMENTS 5,168,998 12/1992 Satoh et al. ................... 206/387
5,186,325 2/1993 Sato et al. ..................... 206/232

FOREIGN PATENT DOCUMENTS 54-155521 10/1979 Japan .
4-27794 3/1992 Japan .
4-78182 7/1992 Japan .

*Primary Examiner*—William I. Price
*Attorney, Agent, or Firm*—Panitch Schwarze Jacobs & Nadel

[57] ABSTRACT

A housing case for a tape cassette, including a main body, a lid pivoted to the main body at one edge and an index card for indicating various items on the tape cassette, said index card being inserted along the inner surface of the lid, said lid including a flat portion 19, a step portion 23 and a recess portion 21 for receiving a thick portion of the tape cassette. the step portion 23 is provided with at least one retainer lug 31 consisting of a slanted surface extending from, and away from the plane of, the inner surface of the flat portion in the direction of the insertion and a surface extending from the distal end of the slanted surface in the direction substantially normal to said flat portion 19, and said index card is provided with at least one opening for receiving the retainer lug 31. The construction makes it easy to insert the index card which is then held securely in position.

2 Claims, 4 Drawing Sheets

HOUSING CASE FOR TAPE CASSETTE WITH INDEX CARD

TECHNICAL FIELD OF THE INVENTION

The present invention relates to a housing case for a tape cassette and more particularly a housing ease for tape cassette having an index card.

PRIOR ART

Typical housing case among the conventional housing cases for magnetic tape cassettes has been comprised of a main housing body provided with a pair of reel stop posts and a lid, with a pivotal pin fit in a hole on each lateral side of the main body and the lid. The lid has a U-shaped pocket formed along the edge portion on the pivoted side to hold a tape cassette therein. In such a housing case, an index card bearing memorandum columns for recording contents of the musics or vocal information recorded on the tape cassette, symbols, dates or the like is inserted in the case along the inner surface of the usually transparent lid of the housing case, so that the contents of the index card can be seen through from the outside.

With the housing case of such conventional construction, it has often been experienced that the index card is unwantedly withdrawn together with the tape casette when the latter is took out of the housing case due to the friction between the index card and the tape cassette.

This problem can be greatly reduced when the index card is formed into a U-shape configuration at one edge portion of the card which is kept in contact with three inner surfaces of the U-shaped pocket. However, this problem remains unsolved when an index card having a L-shape is inserted in the pocket and kept in contact with two inner surfaces of the pocket. This is because the frictional force between the index card and the inner surfaces of the housing case becomes smaller.

On the other hand, in another conventional housing case similar to this type which, however, has a L-shaped configuration instead of the U-shaped pocket on the pivoted side of the lid to house a front thick part( head housing) of the cassette, one side of the thick part, is exposed to the air and thus the total thickness of the housing case can be reduced by the thickness of the wall of the housing case. However, an index card formed into a U-shape or L-shape cannot be properly retained in position and is easily withdrawn when the casette is taken out from the housing case due to an insufficient friction between the index card and the inner two surfaces of the case.

To solve this problem, Japanese Utility Model Kokai No. 4-27784 proposed a housing case in which the lid is provided with a bulge at the inner surface of its free edge, so that the free edge of the index card is engaged with this bulge. Japanese Utility Model Kokai No. 4-78182 proposed a housing case in which projections are formed the inner lateral surfaces of the housing case so as to retain an upright flap of the L-shaped portion of the index card by engagement of the projections with the inner surface of the flap of the L-shaped portion.

PROBLEM TO BE SOLVED BY THE PRESENT INVENTION

These constructions of the the conventional housings are effective but cannot avoid a few drawbacks. In the former case, since the bulge is provided on the free edge, there will be no substantial restriction after removal of the tape cassette and accordingly the index card can easily come out of the position with a slight external force or gravity. In the latter case, setting of the index card requires a complicated work to insert the flap of the index card between the projections and the end wall of the housing case.

Moreover, since these housing cases are of the type that the tape cassette is simply inserted in the case and not retained by a pocket, when the case is opened to the extent that the reel stops are removed from the reel openings of the cassette, the cassette is easily slid off from the position if the lid is slightly slanted from the horizontal position.

OBJECT OF THE INVENTION

Accordingly, a principal object of the present invention is to solve the problem of such easy unwanted withdrawal of the index card.

Another object of the present invention is to solve the problem of easy withdrawal of the tape cassette along with the above object.

A further object of the present invention is to provide a housing case which is easy to insert the index card into the housing case.

MEANS TO SOLVE THE PROBLEM

The present invention provides a combination of a housing case for housing a tape cassette, including a main body and a lid pivoted at one end to the main body, and an index card for indicating various items on the tape cassette, said index card being inserted along the inner surface of the lid, the said lid including a flat portion 19, a step portion 23 and a recess 21 for receiving a thick portion of the tape cassette in this order as seen in the direction of the insertion of the tape cassette, characterized in that the step portion 23 is provided with at least one retainer lug 31 consisting of a slanted surface extending from, and away from the plane of, the inner surface of the flat portion in the direction of the insertion and a surface extending from the distal end of the slanted surface in the direction substantially normal to said flat portion 19, and said index card is provided with at least one opening receiving the retainer lug 31.

The height as measured from the flat portion is substantially equal to or thinner than the thickness of the index card in order that the retainer lug is not in the insertion path of the tape cassette.

FUNCTIONS AND EFFECTS

With the housing case for tape cassette according to the present invention, the index card is retained in position by the retainer or stop lug and thus the problem of withdrawal at the time of taking out: the tape cassette from the housing case can be avoided.

In addition, it becomes easy to insert the index card into the housing case because the retainer lug has a slanted surface from the inner surface of the flat portion in the direction of insertion of the index card owing to the fact that the resistance in this direction is very small. In the inserted position, the index card is retained in position as the surface of the lug normal to the flat surface is engaged with the edge of the opening of the index card when the index card is pulled in the withdrawal direction.

Moreover, as the inner surface of the lid of the housing case includes the flat portion and the recess and the front thick portion of the tape cassette is received in this recess, the tape cassette is prevented from sliding off from the case even if the case is slanted to some degree from the horizontal position as the index card is held in flexed condition between the recess and the thick portion of the cassette. This recess also contributes to reducing the overall thickness of the housing case.

DETAILED EXPLANATION OF THE EMBODIMENT OF THE INVENTION

A housing case for housing a magnetic tape cassette according to a preferred embodiment of the present invention will now be explained in detail by making reference to the accompanying drawings.

Figure 1:
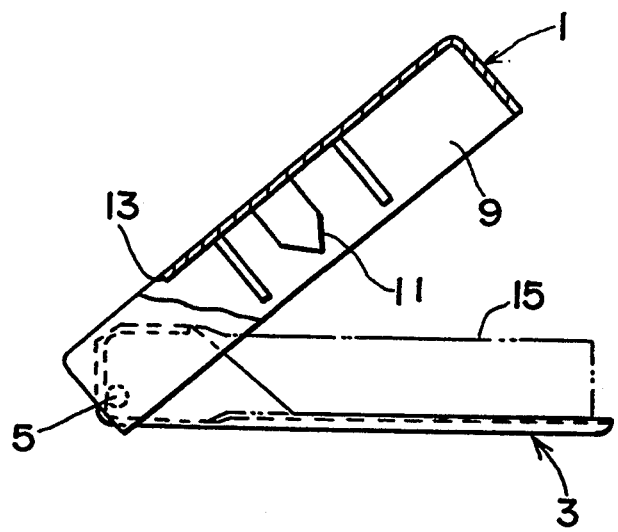
FIG. 1 is a side view of the housing case according to a preferred embodiment of the invention.

Referring first to the general view of FIG. 1, a housing case according to the invention includes a transparent or opaque main body 1 and a transparent lid or cover 3. The main body and the lid are pivotally connected at their one edges by means of pins 5 and bearing holes 7 on both side walls 9. On the inner flat surface of the main body are formed a pair of reel stops 11 and the front edge 13 of the flat surface is formed at a position clear of a front thick portion (head house) of a cassette 15(indicated by chained lines). Incidentally, a small recess (not shown) is formed on the side wall 9 of the main body 1 and a small lug 17 is formed on the side wall of the lid 3 so that they cooperate together to serve as a detent.

Referring now to FIGS. 2-4 and 8-9 which illustrate the lid characterized by the feature of the present invention, the lid 3 includes integrally a flat portion 19, a slope or slanted portion 23 and a recess portion 21 connected in this order, a pair of side walls 25 standing on both lateral sides of the recess portion 21 and a front wall 27 standing on the front edge of the recess portion. The meeting Portions of the lateral walls 25 and the front wall 27 are provided with retaining members 29 for retain the corners of the tape cassette to be inserted in the housing case. Over the recess portion there is no upper wall which was present in the conventional housing case having U-shaped pocket. Accordingly, when a tape cassette is inserted into the case, the upper surface of the thick portion 32 of the cassette is exposed to the air to reduce the total thickness of the housing case and the corners at the thin portion of the cassette are held by the retaining members 29. The lower surface of the thick portion of the cassette is housed in the recess portion 21 to lessen the thickness of the housing case. Thus, the lid may be slanted to some extent from the horizontal plane without causing the tape cassette to be dislodged out of position by gravity when the lid is opened to such a degree that the reel stops no longer engage the reel openings, because the thick portion of the cassette not only flexes the index card but also engages the slope 23 of the case.

Figure 8:
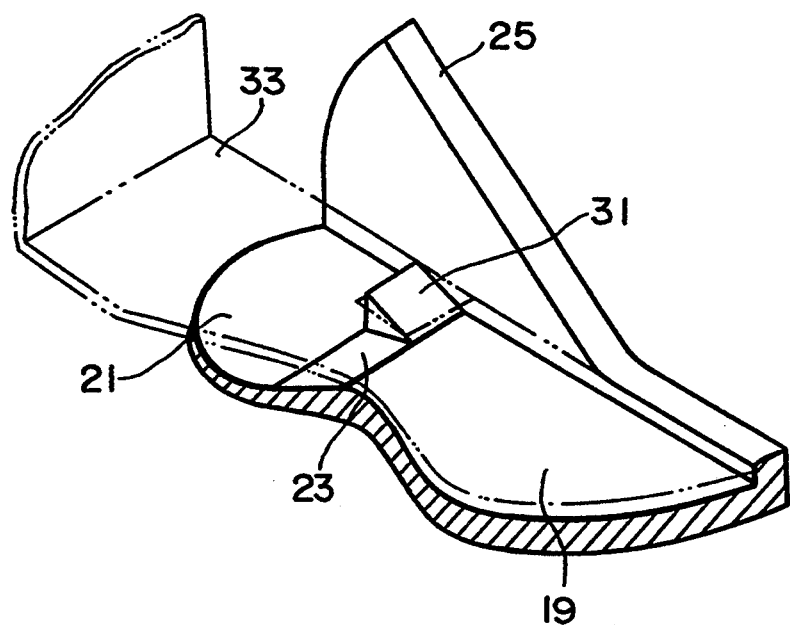
FIG. 8 is a perspective view of the principal part of the lid according to the present invention.
Figure 9:
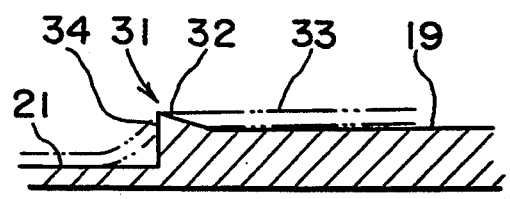
FIG. 9 illustrates the case with the index card inserted in position.

According to the feature of the present invention, as shown in FIGS. 8–9, a retainer lug 31 is provided on the slope 23 at each lateral end of lid at a position close to each of the lateral walls 25. The lug 31 projects upwardly from the inner surface of the flat portion 19 and has a slanted surface 32 gradually becoming higher as measured from the inner surface of the flat portion 19 in the direction of the insertion of an index card and the forward end of the slanted surface 32 is connected a bluff or vertical surface 34 standing from the recess 21 in the direction substantially normal to the inner surface of the flat portion 19. The height of the lug 31 is so selected that it is the same as or less than the thickness of the index card to be inserted, so that the cassette is not prevented by the lug 31 from smooth insertion into and removal out of the case. When the index card 33 is inserted into position, the index card takes the position shown in FIG. 8. Further, in this condition, the index card 33 is flexed as shown in FIG. 9.

Figure 6:
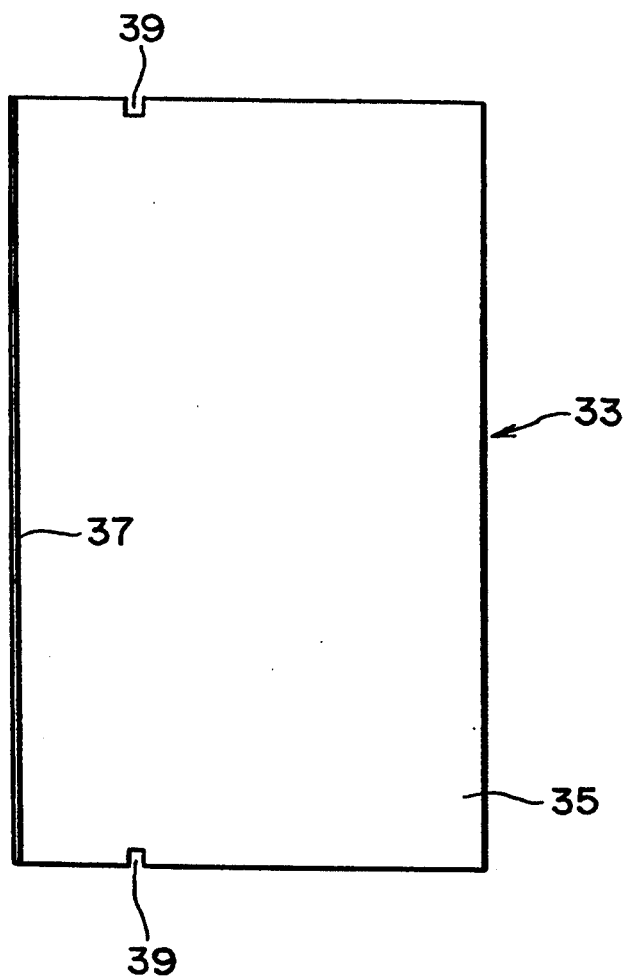
FIG. 6 is a plane view of an index card according to the present invention.
Figure 7:
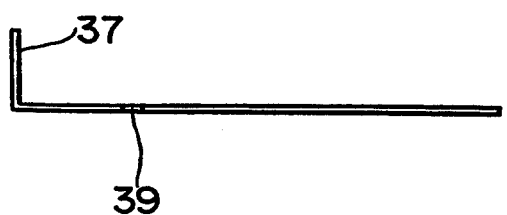
FIG. 7 is a side view of the index card according to the present invention.

FIGS. 6–7 illustrate an example of the index card 33 to be inserted and placed along the inner surface of the lid 3. The index card 33 is comprised of a rectangular portion 35 to be placed on the inner surfaces of the flat portion 19 and the recess portion 22 and an upright position or flap 37 to be contacted with the inner surface of the front wall 27. Both edges of the rectangular portion 35 are provided with a cut out or openings 39 which are adapted to be fit with the retainer lugs 31 of the lid 3.

Figure 2:
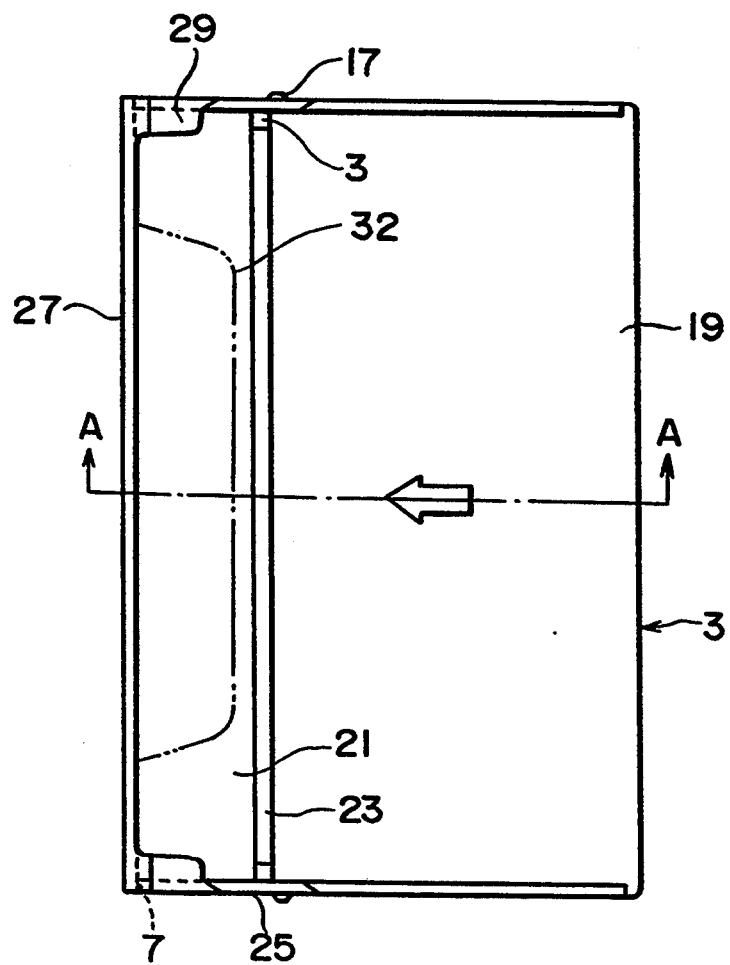
FIG. 2 is a plane view of the lid of the housing case of FIG. 1.
Figure 3:
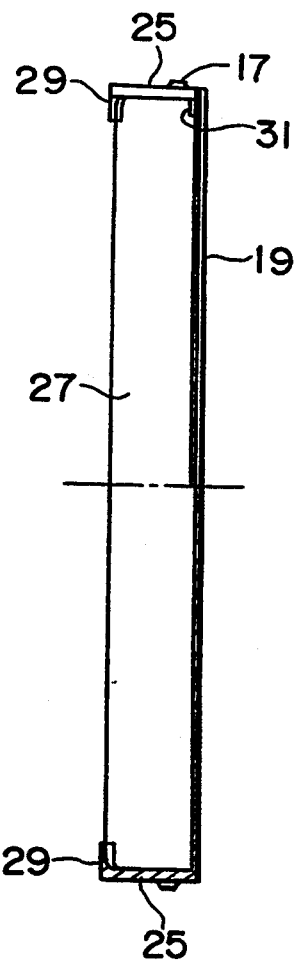
FIG. 3 is a front view of the housing case in FIG. 1 as viewed from the right.
Figure 4:
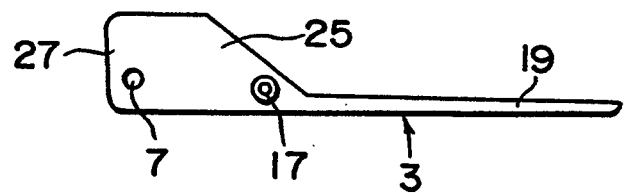
FIG. 4 is a side view of the lid of the embodiment.
Figure 5:
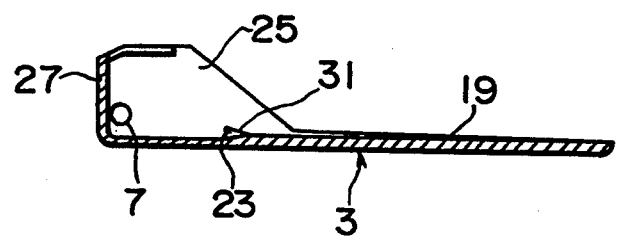
FIG. 5 is a cross sectional view taken along the line V—V of FIG. 2.

Before insertion, the index card 33 is folded into a L-shape as shown in FIG. 7 and then is inserted into the housing case along the inner surface of the flat portion 19 of the lid 3 in the direction indicated by an arrow in FIG. 2 until the upright flap 37 comes into contact with the front wall 37 when the notch or opening 39 is automatically received by the retainer lug 31 and thus the index card 33 is locked in position as shown in FIG. 8. Then, a tape casette is inserted into the housing case and the thick portion of the cassette is dropped into the recess portion 21 and the index card is bent or flexed by the thick portion of the cassette.

ADVANTAGES RESULTING FROM THE INVENTION

With the housing case for tape cassette constructed according to the present invention, the index card is retained in position by the retainer or stop lug and thus the problem of withdrawal at the time of taking out the tape cassette from the housing case can be avoided.

In addition, it becomes easy to insert the index card into the housing case because the retainer lug has a surface slanted from the inner surface of the flat portion in the direction of insertion of the index card, owing to the fact that the resistance in this direction is very small. In the inserted position, the index card is retained in position as the bluff surface of the lug extending normal to the flat surface is engaged with the edge of the opening of the index card when pulled in the withdrawal direction.

Moreover, as the inner surface of the lid of the housing case includes the flat portion and the recess and the front thick portion of the tape cassette is received in this recess, the tape cassette is prevented from sliding off from the case even if the case is slanted to some degree from the horizontal position. This recess also contributes to reducing the total thickness of the housing case.

What we claim is:

1. A housing case for a tape cassette, including a main body, a lid pivoted to the main body at one edge and an index card for indicating various items on the tape cassette, said index card being inserted along the inner surface of the lid, said lid including a flat portion 19, a step portion 23 and a recess portion 21 for receiving a thick portion of the tape cassette in this order as seen in the direction of the insertion of the tape cassette, characterized in that the step portion 23 is provided with at least one retainer lug 31 consisting of a slanted surface extending from, and away from the plane of, the inner surface of the flat portion in the direction of the insertion and a surface extending from the distal end of the slanted surface in the direction substantially normal to said flat portion 19, and said index card is provided with at least one opening for receiving the retainer lug 31.

2. A housing case according to claim 1 wherein the height of the retainer lug as measured from the flat portion is substantially equal to or lower than the thickness of the index card.

* * * * *